United States Patent [19]
Balfrey et al.

[11] Patent Number: 5,722,156
[45] Date of Patent: Mar. 3, 1998

[54] METHOD FOR PROCESSING CERAMIC WAFERS COMPRISING PLURAL MAGNETIC HEAD FORMING UNITS

[76] Inventors: Brian D. Balfrey, 601 Golden West Ave.; J. Charles Thompson, 716 Park Rd., both of Ojai, Calif. 93023

[21] Appl. No.: 446,482

[22] Filed: May 22, 1995

[51] Int. Cl.⁶ .................................................. G11B 5/127
[52] U.S. Cl. .................... 29/603.08; 29/603.12; 29/412; 125/12; 451/41
[58] Field of Search ................... 29/603.01, 603.07, 29/603.08, 603.12, 412, 413, 414, 415, 423, 424; 451/41; 125/12

[56] References Cited

U.S. PATENT DOCUMENTS

| | | | |
|---|---|---|---|
| 3,302,271 | 2/1967 | Matsumoto | 29/603.12 X |
| 3,384,954 | 5/1968 | Bradford et al. | 29/603.12 |
| 4,246,695 | 1/1981 | Tsui | 29/603.12 |
| 4,785,161 | 11/1988 | Strom | |
| 4,835,361 | 5/1989 | Strom | |
| 5,010,429 | 4/1991 | Taguchi et al. | |
| 5,095,613 | 3/1992 | Hussinger et al. | |
| 5,177,860 | 1/1993 | Yura et al. | 29/603.07 |
| 5,184,393 | 2/1993 | Saito et al. | 29/603.07 |
| 5,321,882 | 6/1994 | Zarouri et al. | |
| 5,406,694 | 4/1995 | Ruiz | 29/603.07 |
| 5,559,051 | 9/1996 | Voldman et al. | 29/603.08 X |

*Primary Examiner*—Timothy V. Eley
*Attorney, Agent, or Firm*—Darby & Darby, P.C.

[57] ABSTRACT

A method is disclosed for manufacturing air bearing magnetic read/write heads from a composite ceramic wafer which includes a plurality of transducers. The method includes the step of removing material from the exposed surface of an outermost strip of head forming units on the wafer by contacting the strip with an abrasive held in a rigid matrix and controlling penetration of the abrasive into the strip. The processed strip then is severed from the wafer to expose the side surface of another strip for processing and the foregoing series of steps are repeated until the entire wafer has been exhausted. A unitary apparatus including a plurality of stations for carrying out the method also is disclosed.

28 Claims, 9 Drawing Sheets

METHOD FOR PROCESSING CERAMIC WAFERS COMPRISING PLURAL MAGNETIC HEAD FORMING UNITS

FIELD OF THE INVENTION

The present invention relates to a method for fabricating magnetic heads suitable for use with a magnetic recording disk and an apparatus used for carrying out the method. More particularly, the present invention relates to a method and apparatus for the manufacture of air bearing heads from a composite ceramic wafer which includes a plurality of transducers arranged in strips or rows.

BACKGROUND OF THE INVENTION

Direct access storage devices (DASDs) typically comprise a mechanical drive for rotating a magnetic disk about the axis of the disk. Information is stored on the disk by means of selective magnetization of the disk. Information is transmitted to and from the disk via a head or heads. The head consists of two major components, the transducer and the slider. The magnetic fields are transduced into electrical signals by the electromagnetic transducer, which is positioned near the surface of the disk. The transducer normally is mounted onto a mechanical carrier (the slider) which positions the transducer in close proximity or in virtual contact with the disk surface. Proximity control is facilitated by a gas lubricated bearing which is created between the disk and the slider by a layer of air attached to the rotating disk. The bearing surface on the slider is known as the air bearing surface, or ABS. The ABS may consist of one or more unique, substantially planar surfaces.

The transducer consists of one or more coils arranged to define a conductive path and a plurality of magnetic poles positioned so that current flow in the coils induces a magnetic flu in the poles. The magnetic poles have tips which terminate at the air bearing surface and direct an induced magnetic flux at the disk such that selective magnetization of the disk is accomplished. Transducers may also utilize magnetoresistive materials in the poles or other elements to transduce magnetic and electrical signals.

Several qualities of a magnetic head are critical to the level of performance of an information handling system in which the head is used and, heretofore, have been produced in existing manufacturing processes with limited success.

One feature of a magnetic head which is important to satisfactory performance of a disk drive is the finish characteristics of the air bearing surface, which is to say that the air bearing surface on the magnetic head must have a very exacting surface finish with regards to roughness and microgeometry. Roughness is characterized by a quantity called roughness average, or Ra. The roughness average of an air bearing surface on a magnetic head must be tightly controlled between about 20 Å and 160 Å. Control of the microgeometry of the air bearing surface is essential to maintaining a desired contact area or bearing ratio of the surface. Control of contact area is critical for reducing static friction ("stiction") when the head contacts the recording media.

A second feature of a magnetic head which is important to satisfactory performance of a disk drive is the distance between the pole tips and the widened portion of the magnetic pole, which distance commonly is referred to as the throat height. Transduction characteristics of a magnetic head are a sensitive function of the throat height and throat height therefore must be held to tolerances on the order of tenths of microns.

In addition, for optimal magnetic performance, the pole tips should terminate at the air bearing surface and should not be recessed into the surface. It is desirable to limit any recession of the pole tips to the same order of magnitude as the roughness average of the air being surface, i.e., 20 Å–160 Å with zero recession being the best case.

An existing method of producing a transducer/slider structure (a head) is by way of thin film microfabrication. Prior techniques for producing thin film magnetic heads involve forming an array of transducers on a substrate, or wafer. The wafer may consist of aluminum oxide—titanium carbide or other suitable materials. Transducers are made of aluminum oxide, nickel iron, copper, gold, or other suitable materials and typically are arranged into rows (or strips) and columns on a wafer. A row of transducers is sliced from the wafer in a solid bar and the bar is then processed into individual sliders.

More specifically, a slider is typically formed with a plurality of primarily coplanar surfaces with recessed areas between the surfaces. The coplanar surfaces serve as the air bearing surfaces. One common configuration has two parallel rails with a recessed area between the rails. Typically at one end of the slider is a plurality of primarily coplanar surfaces oriented at a shallow angle to the air bearing surfaces. This second set of surfaces comprise what are known as leading to edge ramps. Together the air bearing surfaces and the leading edge ramps assist gliding over moving air at a uniform distance from the surface of a rotating magnetic disk.

According to the prior methodology, a single bar comprising one row of sliders is successively bonded to and debonded from a series of fixtures or tools during various stages of processing. The bar is then machined into individual sliders, with each slider carrying one or more transducers. During this process, it is critical to maintain collinearity of the transducers and to machine the bar to a desired thickness in order to achieve a desired throat height. However, the single bars tend to bow or bend, making it very difficult to attain this objective. Preventing deformation of a row is particularly difficult during known machining processes such as lapping because, as described further below, in order to increase the material removal rate during lapping, contact pressure with the work piece must be increased, which tends to increase the distortion. Further, the time required for sequentially bonding and debonding each single-row bar increases production costs and limits practicality of the method for high volume applications.

One attempt at overcoming the problems discussed above is a technique proposed in U.S. Pat. No. 5,095,613 to Hussinger et at., issued Mar. 17, 1992. In the process disclosed by Hussinger, a wafer on which a plurality of read/write transducers have been manufactured is glued to a fixture so that a row of transducers are exposed and available for processing. The row of transducers are all simultaneously machined by a lapping process to theoretically provide the appropriate throat height for the transducers. The individual sliders on the working bar are then separated and the working bar is then cut from the wafer for machining of the rails. The teachings of Hussinger have obtained only minimal practical utility due to the number of limitations inherent in the lapping process.

Lapping is a free-abrasive machining process in which material is removed by the random relative motion between fine loose abrasive, which is suspended in a liquid medium, and the work piece (in this case, the slider). The "lap" is typically an approximately flat disk that is made to rotate about its axis. Relative motion of the loose abrasive is created when some pressure is applied to bring the surface of the lap and the work piece into contact with each other. There are several characteristics of lapping which make lapping a difficult, time intensive, and expensive technique to utilize in a manufacturers process yet due to lack of a superior method, manufactures continue to rely upon lapping for finishing air bearing surfaces and attempting to establish appropriate throat height on sliders.

For instance, lapping generally is capable of finishing an air bearing surface to the approximately correct roughness average. However, due to the random motion of the abrasive particles relative to the work piece during lapping, it typically is not possible to control the specific microgeometry of the air bearing surface or the resulting frictional properties of the air bearing surface.

Also, producing a desired throat height dimension requires removing a specific volume of material, which amount may vary from one slider to the next. The removal rate and lapping time are varied in order to indirectly control removal volume. However, as stated above, lapping is a "pressure-copying" process in which the rate at which material is removed is a function of the contact pressure between the work piece and the lap. Since material removal rate is a relatively insensitive, time-varying function of contact force, accurately controlling the removal rate is inherently difficult and production of a specific, repeatable throat height dimension has also been difficult.

In an attempt to overcome these difficulties in controlling throat height during lapping, prior processes (including Hussinger) have resorted to implementing lapping guides as an integral part of the wafer to assist in the measurement of the throat height while the lapping is in progress. The lapping guides are either optical targets examined by microscopic inspection, or electronic devices that experience a change in state, such as resistance, as the lapping approaches the desired throat height. A problem with optical lapping guides is that optical inspection is not compatible with lapping apparatus, requiring that the workpiece be removed and examined while in process. The problem with stopping and starting the lapping process is that the lapping conditions often change after the part is replaced, causing an inherent loss of controllability. Additionally, the interruption is relatively lengthy, which is undesirable in terms of both time and labor costs. Electronic or resistive lapping guides require expensive and complex equipment for measuring and controlling a signal in the work piece while lapping.

Still further limiting the utility of Hussinger is that the pressure-copying nature of lapping tends to cause the pole tips to be recessed. Since the pole tip material and the surrounding air bearing surface material differ greatly in their physical and chemical properties, such as their respective elastic moduli, they tend to lap at different rates. Specifically, the pole tips tend to machine faster, resulting in recession of the poles into the air bearing surfaces.

Lapping is a relatively slow material removal mechanism, as conceded in Hussinger and known to those versed in the art. Thus, it is expensive relative to other material removal mechanisms, such as traditional grinding. However, grinding processes, as they are currently known, would cause fracturing of the highly brittle ceramic materials from which sliders are formed and are wholly unsuitable for producing the precision required in an air bearing surface.

There is, therefore, a need for a new and improved method and apparatus for making magnetic heads which will overcome the above limitations and disadvantages.

OBJECTS OF THE INVENTION

It is a general object of the present invention to provide a high precision manufacturing method and apparatus used therein for efficiently producing air bearing magnetic read/write sliders from a composite ceramic wafer which includes a plurality of transducers. The method and apparatus disclosed herein will include improvements and innovations directed particularly toward overcoming the above noted deficiencies associated with the prior art.

It is a further object of the present invention to provide a highly efficient manufacturing method of the above character in which the throat height, air bearing surfaces, and leading edge ramps of an entire strip having a plurality of head forming units are made in successive passes by contacting the head forming units with an abrasive held in a rigid matrix and controlling the penetration of the abrasive into the head forming units.

It is a further object of the present invention to provide a manufacturing method of the above character in which the abrasive is a particle having a maximum cross sectional dimensional less than about 8 microns and wherein depth of penetration of the abrasive into the surface is controlled to a tolerance of less than about 25 nanometers.

It is a further object of the present invention to provide a manufacturing method of the above character in which the abrasive has a concentration in the matrix in the range of about 15% by volume to about 24% by volume.

It is a further object of the present invention to provide a manufacturing method of the above character in which the abrasive is diamond and the matrix comprises a material selected from the group consisting of cast iron, bronze, bronze-ceramic, and thermosetting resin containing a conductive filler agent such as graphite or copper particles.

It is a further object of the present invention to provide a manufacturing method of the above character in which the matrix is an annular disc shaped wheel continuously rotated about an axis thereof during contact with the bar at a peripheral speed in the range of about 50 meters per second to about 120 meters per second.

It is a further object of the present invention to provide a manufacturing method of the above character in which the throat height, air bearing surfaces, and leading edge ramps of a single row of multiple head forming units are produced while the strip or row of head forming units is integral with a wafer, and which includes the step of separating the strip of head forming units as a solid bar from the wafer prior to removing the individual head forming units from the bar.

It is a further object of the present invention to provide a manufacturing method of the above character in which heat generated by the action of removing material from head forming units with abrasive is removed by the flow of liquid such that the temperature rise in the head forming units is minimal.

It is a further object of the present invention to provide a manufacturing method of the above character in which bars consisting of a plurality of magnetic head forming units are continuously fabricated and removed from a wafer containing strips of transducers. After a single strip of head forming units integral with a wafer have been processed so that the throat height, air bearing surfaces, and leading edge ramps have been produced, a bar containing this single strip of integral head forming units is severed from the wafer to expose the surface of another strip of integral head forming units. This next strip is similarly processed and the foregoing steps are repeated until all strips (rows) of integral head forming units in the wafer have been processed into bars.

It is a further object of the present invention to provide a manufacturing method of the above character in which the boundaries defining the plurality of air bearing surfaces are formed on the entire row or strip of integral head forming units prior to processing the row into a bar.

It is a further object of the present invention to provide a manufacturing method of the above character in which a wafer containing a plurality of head forming units arranged in strips is secured to a carrier which is guided for movement along a predetermined path between a plurality of processing stations, at which a single strip of head forming units is processed into a bar while the wafer remains secured to the carrier.

It is a further object of the present invention to provide a manufacturing method of the above character in which the path of the carrier is parallel to the substantially planar face of a rotary cutting tool, feeding the wafer past the face of the tool in a radial direction.

It is a further object of the present invention to provide a manufacturing method of the above character in which prior to feeding the wafer past the face of the tool, the carrier advances the wafer relative to the tool in an axial direction past the surface of the wafer by a specified distance, so that an exposed strip of heads on the wafer may make contact with the tool and hence be machined as the wafer is fed past the face of the tool.

It is a further object of the present invention to provide a manufacturing method of the above character in which the wafer is rough ground by advancing it relative to the tool in an axial direction a distance in the range of about 1 micron per pass to about 5 microns per pass across the face of the tool.

It is a further object of the present invention to provide a manufacturing method of the above character in which the wafer is fine ground by advancing it relative to the tool in an axial direction a distance in the range of about 200 nanometers per pass to about 400 nanometers per pass across the face of the tool.

It is a further object of the present invention to provide a manufacturing method of the above character in which the wafer is fed radially toward the cutting tool at a rate in the range of about 40 microns per tool revolution to about 100 microns per tool revolution.

It is a further object of the present invention to provide a manufacturing method of the above character in which the bar is fed radially toward the cutting tool at a rate in the range of about 1 micron per tool revolution to about 40 microns per tool revolution.

It is a further object of the present invention to provide a manufacturing method of the above character in which superfluous portions of a wafer are sliced from the wafer at an initial processing station to expose a strip of head forming units on the wafer desired to be machined.

It is a further object of the present invention to provide a manufacturing method of the above character in which the orientation of the wafer relative to the path of the carrier and the substantially parallel face of a rotary cutting tool is sensed and the orientation of the carrier is adjusted so that row of head forming units is appropriately aligned with the direction of the path of the carrier and the substantially planar face of the tool.

It is a further object of the present invention to provide an apparatus for carrying out the method disclosed herein.

SUMMARY OF THE INVENTION

The present invention is based on the use of a rigid abrasive grinding process for machining throat height, air bearing surface characteristics, and pole tip recession tolerances in thin-film magnetic recording heads which can be controlled with a higher degree of accuracy than prior loose-abrasive grinding processes. In the disclosed method, the throat height, air bearing surfaces, and leading edge ramps of a single row of head forming units are produced by a novel fixed-abrasive machining process. In this process, material is removed when the head forming units are contacted by abrasive held in a rigid matrix. A completed strip or row of head forming units is sliced from the wafer as a solid bar of integral head forming units. This bar is later separated into individual heads.

The present invention is based on three realizations: 1) that the process of machining throat height, air bearing surface characteristics, and pole tip recession tolerances in thin-film magnetic recording heads can be controlled with a higher degree of accuracy with a fixed-abrasive grinding process than prior loose-abrasive grinding processes, 2) that the throat height, air bearing surfaces, and leading edge ramps are most easily produced from a row of head forming units while integral with a wafer, and hence highly collinear, and 3) that by separating bars of adjacent head forming units following the creation of the throat height, air bearing surfaces, and leading edge ramps, certain batch processing techniques requiring precise location of the head forming units such as ion beam machining can be used in a continuous process for manufacturing magnetic heads on bars prior to separating the bars into individual heads.

In the disclosed method, the throat height, air bearing surfaces, and leading edge ramps of a single row of head forming units are produced by a novel fixed-abrasive machining process. In this process, material is removed when the head forming units are contacted by abrasive held in a rigid matrix. A completed strip of head forming units is sliced from the wafer as a solid bar of finished integral head units, thus maintaining the relative location of the head forming units within the bar for further processing. This bar can be later separated into individual heads.

As opposed to existing fixed-abrasive grinding techniques which would cause catastrophic fractures of the highly brittle ceramic materials from which heads are formed and are wholly unsuitable for producing the precision required in fabricating an air bearing surface, the present invention discloses a novel set of parameters which have been found to produce a superior result in the production of the throat height, air bearing surfaces, and leading edge ramps of magnetic recording heads.

Preferably, the abrasive is a particle having a maximum cross sectional dimension less than about 8 microns, i.e. from zero to 8 microns, and has a concentration in the matrix in the range of about 15% by volume to about 24% by volume. The matrix is a conductive disc made of a strong plastic or suitable metal, which is rotated continuously about an axis thereof with a peripheral speed in the range of about 50 meters per second to about 120 meters per second. A liquid coolant, such as water, is applied to the bar while the heads are being formed.

In order to reduce production time and costs, the present method is iterative in nature and provides for the complete processing of magnetic heads while a strip of head forming units remains integral with a ceramic wafer substrate. Material is removed from the exposed surface at the end of the wafer to attain the appropriate throat height and produce a leading edge ramp and air bearing surface rails on each head. Laser ablation is used to form the boundaries of the air bearing surfaces by techniques known to those versed in the art. The outermost strip then is severed from the wafer as a completed bar to expose the surface of another strip and the newly exposed strip is processed. The foregoing steps are repeated until all strips in the wafer have been processed.

The method is efficiently performed by using an improved apparatus as described below. A wafer having strips each including a plurality of electromagnetic transducers arranged in rows and columns is secured to a carrier. The carrier preferably is guided for movement along a predetermined path between a plurality of processing stations at which the strip is machined to form individual heads along the strip while the substrate remains secured to the carrier. The path of the carrier is parallel to the substantially planar face of the rotating matrix (the "wheel") and the carrier is advanced toward the wheel for processing of the strip.

Performance of the present invention is conditioned upon the rates at which the strip is advanced into contact with the abrasive. It has been determined that optimal results are achieved when the strip is machined in two stages. In order to insure that the grinding stages are performed properly, the orientation of the exposed surface on the strip relative to the direction of the carrier path (and relative to the grinding face of the wheel) is sensed prior to machining. Fine adjustments then are made to the position of the substrate within the carrier so that the exposed surface on the strip is aligned with the direction of the carrier path.

In the first stage the strip is repeatedly moved past the cutting tool until the throat height is within approximately 1 micron of the desired value. During each pass of the tool during this stage, the strip is first fed axially toward the cutting tool a distance between about 1 micron and about 5 microns, and then the strip is fed radially towards the cutting tool at a rate in the range of about 40 microns per tool revolution to about 100 microns per tool revolution.

The second stage of machining provides precision grinding to the desired throat height. During each pass of the tool during this stage, the strip is first fed axially toward the cutting tool a distance between about 200 nanometers and about 400 nanometers, and then the strip is fed radially towards the cutting tool at a rate about 40 microns per tool revolution. The sequence of passes are determined such that during the final pass, the axial motion of the strip is at least about 200 nanometers and that the exact throat height is achieved as the strip is fed radially across the tool.

A ramped leading edge is formed across the entire strip by orienting the rotational axis of the cutting tool so that the exposed surface of the outermost strip on a wafer is inclined relative to the plane of surface of the wheel. When the strip is advanced along the path and into contact with the abrasive the grinding motion forms an oblique planar ramp on the strip.

Unlike lapping, which is essentially a pressure-copying process in which the depth to which an abrasive penetrates a work piece can be controlled only with complex and expensive lapping guides, the present invention provides a motion-copying process in which the depth of penetration of the abrasive into a strip is accurately controlled on the order of nanometers. Consequently, the critical characteristics of a recording head can be controlled with much greater precision than is currently possible, thereby greatly improving the magnetic performance of the heads. Moreover, the nature of the disclosed process allows heads to be manufactured with a simpler apparatus and in less time than the previous state of the art.

DETAILED DESCRIPTION OF THE PREFERRED EMBODIMENTS

Figure 1:
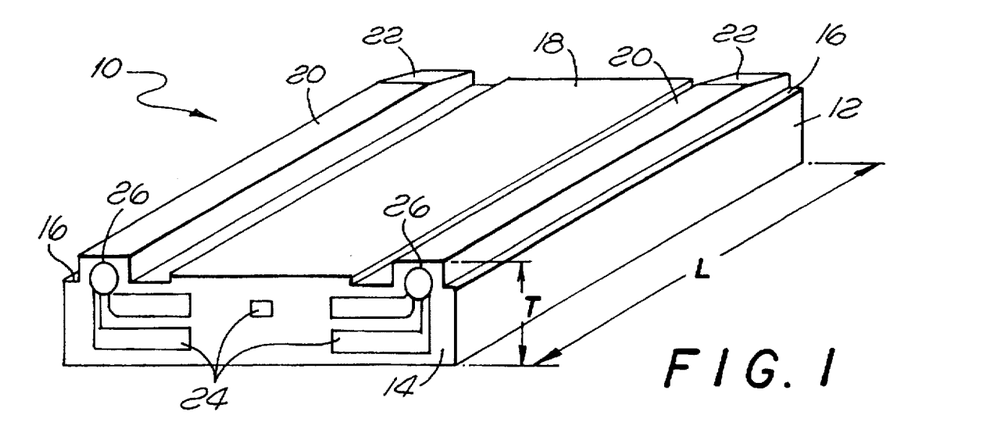
FIG. 1 is a perspective view of a magnetic read/write head manufactured in accordance with the method and apparatus of the present invention.
Figure 2:
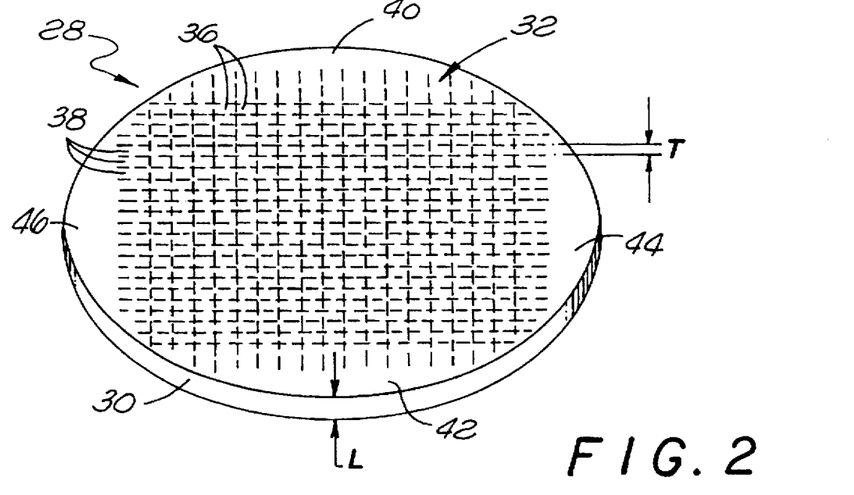
FIG. 2 is a perspective view of a pre-processed wafer.
Figure 3:
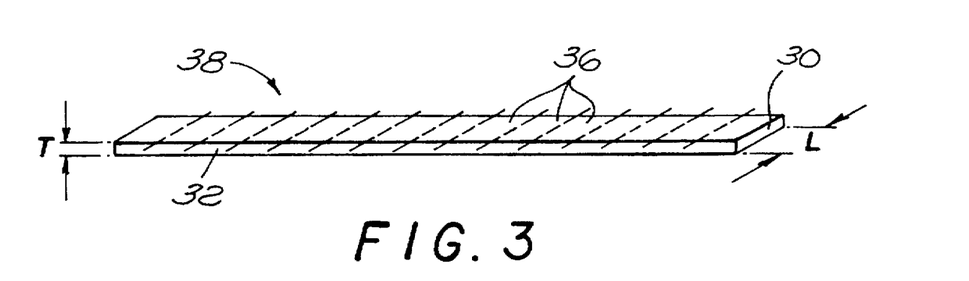
FIG. 3 is a perspective view depicting detailed structure of a finished bar of magnetic heads constructed in accordance with the present invention.

Referring first to FIGS. 1 to 3, a thin film magnetic read/write head produced according to the present invention is designated at the numeral 10 and consists of a generally rectangular slider 12 and a transducer bearing head portion 14 on an end face of the slider 12. The slider 12 is formed of $Al_2O_3$-TiC ceramic or other suitable material and generally comprises two parallel rails 16 on opposite sides of a recessed face 18 of the magnetic head 10.

The top surface of each rail 16 constitutes an air bearing surface 20 of the magnetic head 10. A ramp 22 is formed at the leading edge of the air bearing surface 20 opposite the transducer portion 14. The rails 16, the recessed face 18, and the air bearing surface 20 are features of the magnetic head 10 that enable the transducer portion 14 to "fly" at a short distance from the surface of a magnetic disk.

Figure 12A:
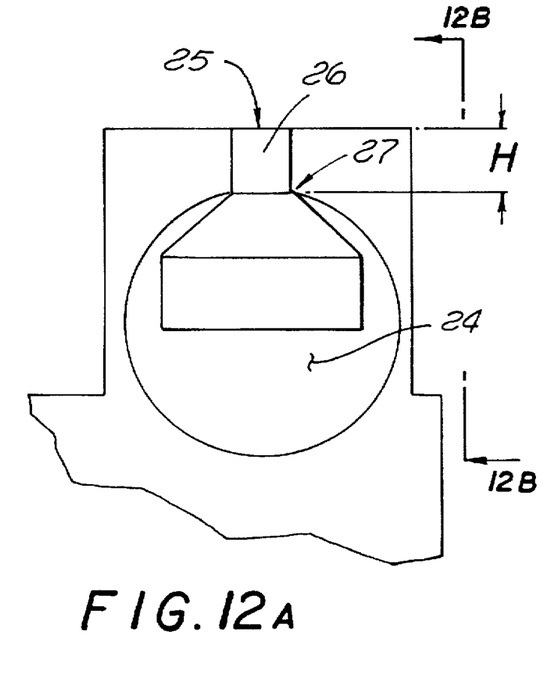
FIG. 12A is an enlarged detailed view in cross-section the magetic head of FIG. 1, as manufactured in accordance with this invention.
Figure 12B:
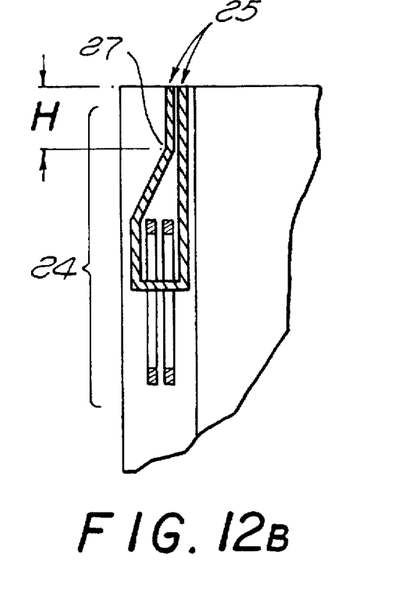
FIG. 12B is a sectional view taken along the lines 12B—12B of FIG. 12A.

The transducer portion 14 is a thin layer of $Al_2O_3$ containing an electromagnetic transducer 24 which is constructed by a conventional photolithography process. The transducer 24 has poles 26 that terminate at their upper ends on the air bearing surface 20 of the rails 16. The poles 26 are made of a suitable ferromagnetic material such as nickel-iron. Transducing performance of the magnetic head 10 is a sensitive function of the throat height, H, of the poles 26 above the pole widening point, that is, the length (H) of the transducer 24 between tips 25 of the poles 26 (at the air bearing surface 20) and the widened portion 27 of the poles 26 as shown in FIGS. 12A—12B.

FIGS. 2 and 3 illustrate a pre-processed wafer 28 from which the above described thin film magnetic head 10 is fabricated. The wafer 28 comprises a wafer substrate 30 made of Al$_2$O$_3$-TiC ceramic, and is covered by a thin layer 32 of Al$_2$O$_3$. The transducers 24 are contained in the layer 32. The transducers 24 are arranged in rows and are identically oriented.

Specifically, the wafer 28 comprises a matrix of individual head forming units 36 which when fully processed will become magnetic heads 10. The view shown in FIG. 2 is an end view of the individual head forming units 36 (see the corresponding dimensions "L" and "T" shown in the Figures), the transducers 24 having been formed on the ends of the units 36 exposed in this view and on the forward surface of the construction shown in the perspective view in FIG. 3. As shown in FIG. 2, a plurality of identical strips 38 each of which comprises a row of identical head forming units 36, together with superfluous edge portions 40, 42, 44 and 46, constitute the wafer 28.

Figure 4:
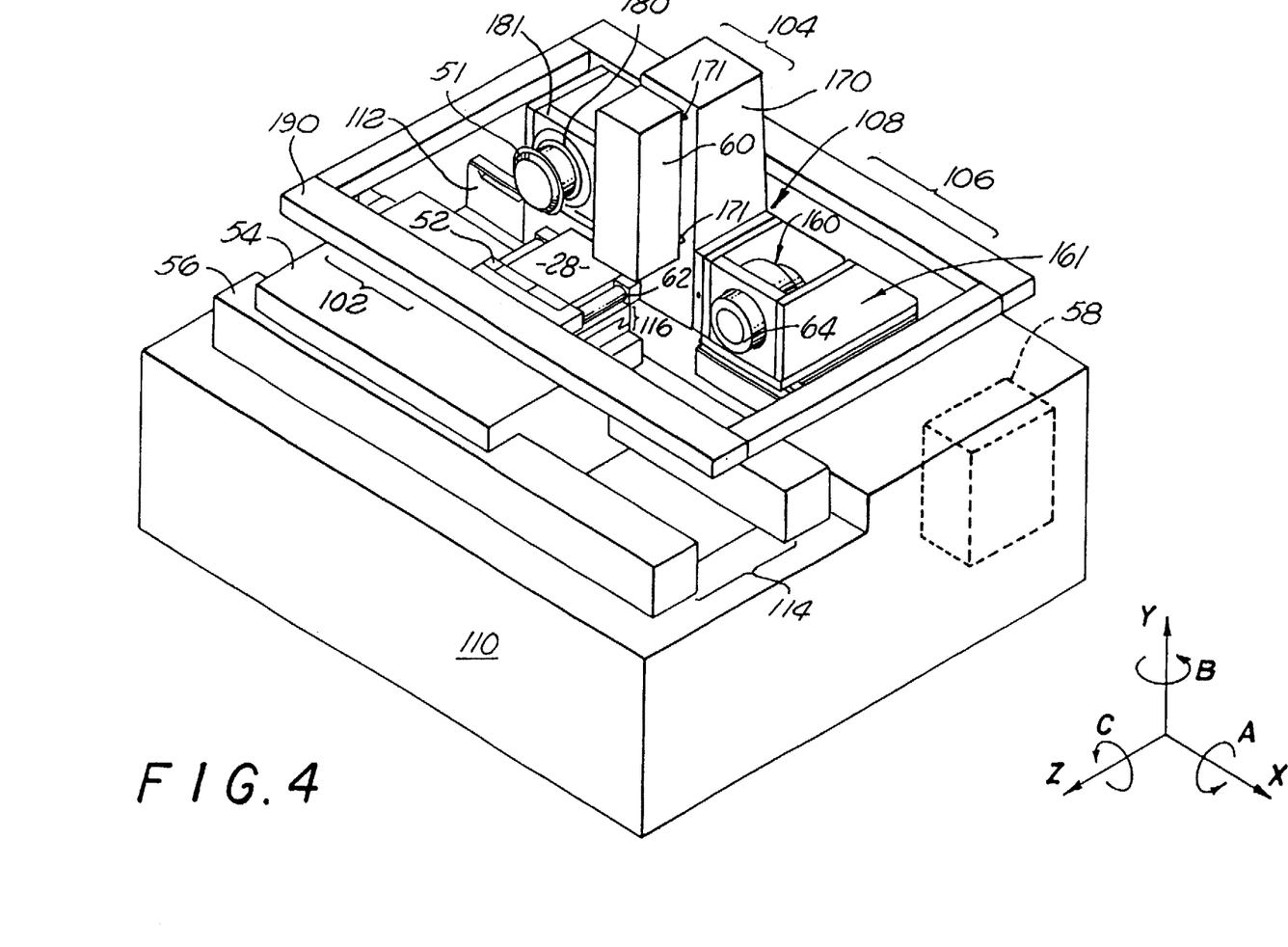
FIG. 4 is a schematic view in perspective showing an apparatus for slicing, aligning and grinding head forming units on a pre-processed wafer in accordance with the present invention and shown in a position for inspecting a row of heads.

Referring to FIGS. 4 through 7, there is illustrated the processing of a ceramic wafer 28 according to the method and using the apparatus of the present invention. Generally, the apparatus of the invention comprises a slicing station 102, an inspection station 104, a grinding station 106, and a laser milling station 108 all being mounted on a rigid base 110 which carries a wafer carrier 52 and clamp 112 on first and second independent guideways 114, 116 (FIG. 4). Steps of the disclosed method also are illustrated schematically in the, process flow diagrams shown in FIGS. 9 and 10 in which the various steps are keyed to the stations and also to FIGS. 4-8. In the preferred embodiment, each of the processing stations is integrated with each other and mounted onto a base 110. The base is preferably made of a material of high specific rigidity and high specific damping capacity such as cast iron, granite, or Granitan, a polymer-aggregate composite developed by the Studer Company of Switzerland.

The grinding station 106 consists of a grinding wheel 64 mounded on an aerostatic spindle 160 such as the Blockhead Model 4R from Professional Instruments Company of Minneapolis, Minn. The spindle is mounted on a structure 161 that allows the spindle 160 to be rotated about the X$_r$ axis by ±1°.

The inspection station 104 consists of a microscope assembly 60 mounted to microscope base 170 by flexural bearings 171. The flexural bearings 171 allow the microscope 60 to translate in Y$_m$ in a range of ±25 microns. The microscope motion may be driven by any suitable actuator such as a piezoelectric actuator.

The slicing station 102 consists of the slicing tool 51 mounted on an aerostatic spindle 180 such as the Blockhead Model 4R from Professional Instruments Company of Minneapolis, Minn. The spindle is mounted on structure 181.

Slide 54 is used to feed wafer 28 for grinding, slicing, and inspection. The slide 54 moves on guideways 56 on aerostatic bearings parallel to reference frame 190. Sensors in carrier 52 measure the position of carrier 52 relative to reference frame 190 and send signals via controller 58 to actuators 62 such that the motion of 28 is straight in the Z$_w$ direction in a range of 25 nanometers.

Slide 116 is an indexing slide which is capable of locking carrier 52 at either end of slide 54 so that wafer 28 may access stations 102, 104, or 106.

The arrangement of the apparatus is such the overall loop stiffness between wafer 28 and wheel 64 is higher than is typical on traditional grinding machines, approximately 85 Newtons per micron. The arrangement also allows for carrying out the process in a fashion that is optimal in the sense that no operator intervention is required once wafer 28 is mounted and that a minimal amount of time is required to complete the process on the entire wafer.

The ceramic wafer 28 is substantially identical to the wafer illustrated in FIG. 2 with the superfluous portions 40, 42, 44 and 46 previously removed from the periphery of the wafer by slicing (block 200). The exposed end of the wafer 28 shown in FIG. 4 thus contains the transducer bearing head portion 14 of an outermost single row strip 38 and as shown is ready for the formation of magnetic heads thereon. In an application where only a subsection of the original wafer 28 bears transducers, that subsection is first sliced out of the wafer (block 210).

The alternate slicing operations 200 and 210 are performed by machining the wafer 28 with a high speed slicing tool 51 in slicing station 102. The same wafer carrying guide and clamp for use in the throat grinding and ramp forming processes also is used to handle the wafer 28 during the slicing operations. In a preferred embodiment, the slicing tool 51 is an abrasive-holding wheel which rotates with a peripheral velocity in the range of about 70 meters per second to about 120 meters per second. The wheel 51 is a rigid disc-shaped matrix made preferably of bronze or bronze-ceramic composite. The cross-sectional dimensions of the abrasive are in the range of about 15 microns to about 25 microns, and in a preferred embodiment the abrasive concentration in the matrix is in the range of about 10% by volume to about 15% by volume.

During slicing of the wafer 28, the wafer preferably is fed into the wheel 51 at a rate in the range of about 4 mm per second to about 6 mm per second and the wheel/wafer interface is cooled with deionized water flowing at a velocity on the same order of magnitude as the peripheral speed of the wheel 51 and with a flow rate preferably in the range of about 70 ml per second to about 150 ml per second.

Prior to grinding in steps 220 and 230, the squared wafer 28 (or wafer subsection) is rigidly connected to a work piece holding fixture 52 attached to a slide 54 movable along a rail 56. As described below, actuator means 62 are provided on the fixture 52 for manipulating the wafer 28 in response to a signal received from a controller 58 and for properly orienting the wafer 28 for grinding. A microscope 60, the image from which is sensed by a charged coupled device or detector (CCD) and analyzed by an image processing computer is positioned near the rail 56 for observing the exposed end of the wafer 28 as the wafer passes thereunder so that the controller 58 can determine the wafer position or throat height and then supply a suitable control signal to actuator means 62 on the fixture 52 for appropriately situating (step 222) the wafer 28.

Figure 5:
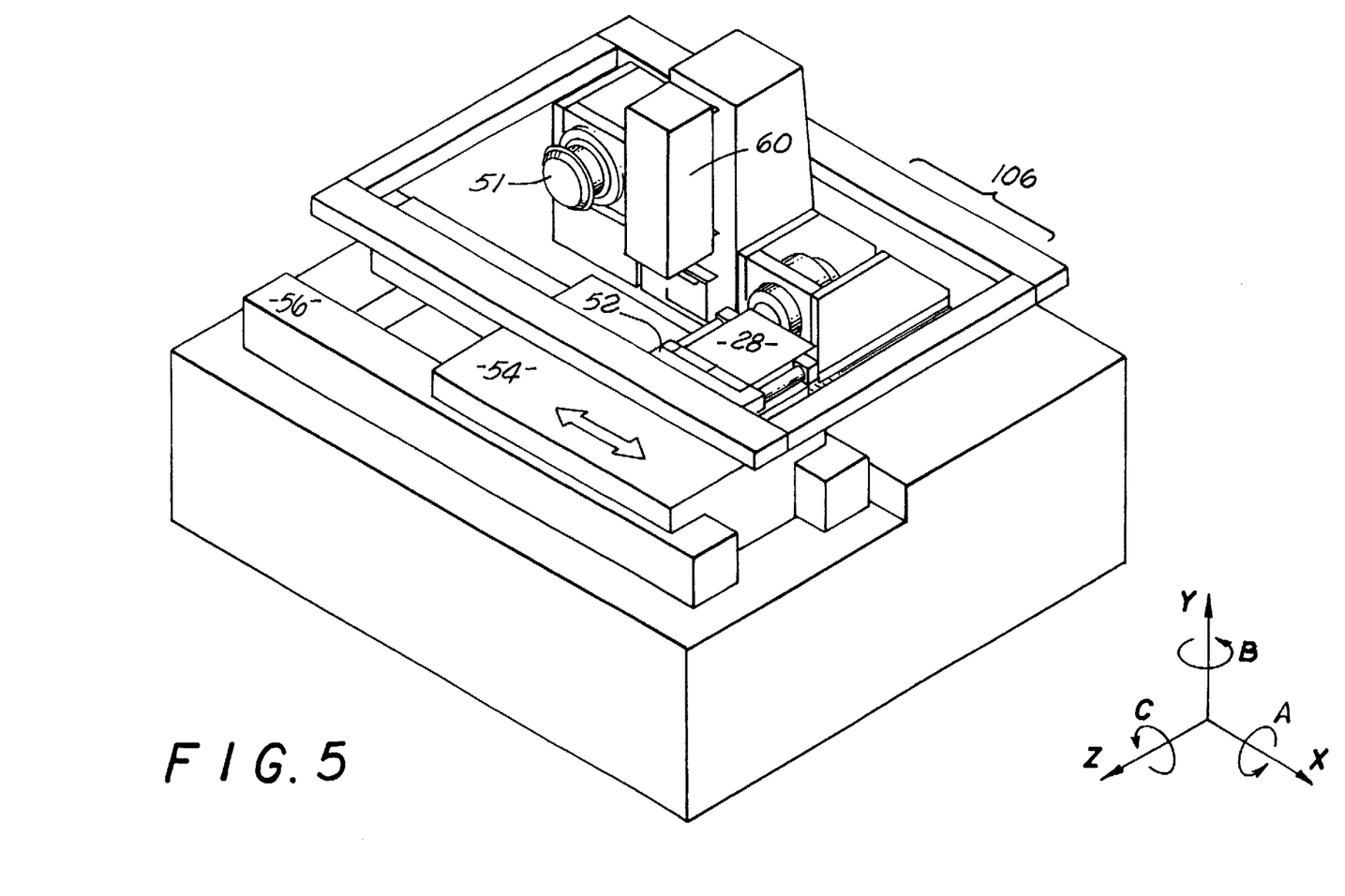
FIG. 5 is a schematic view in perspective showing the apparatus of FIG. 4 in a position for grinding a row of heads.
Figure 6:
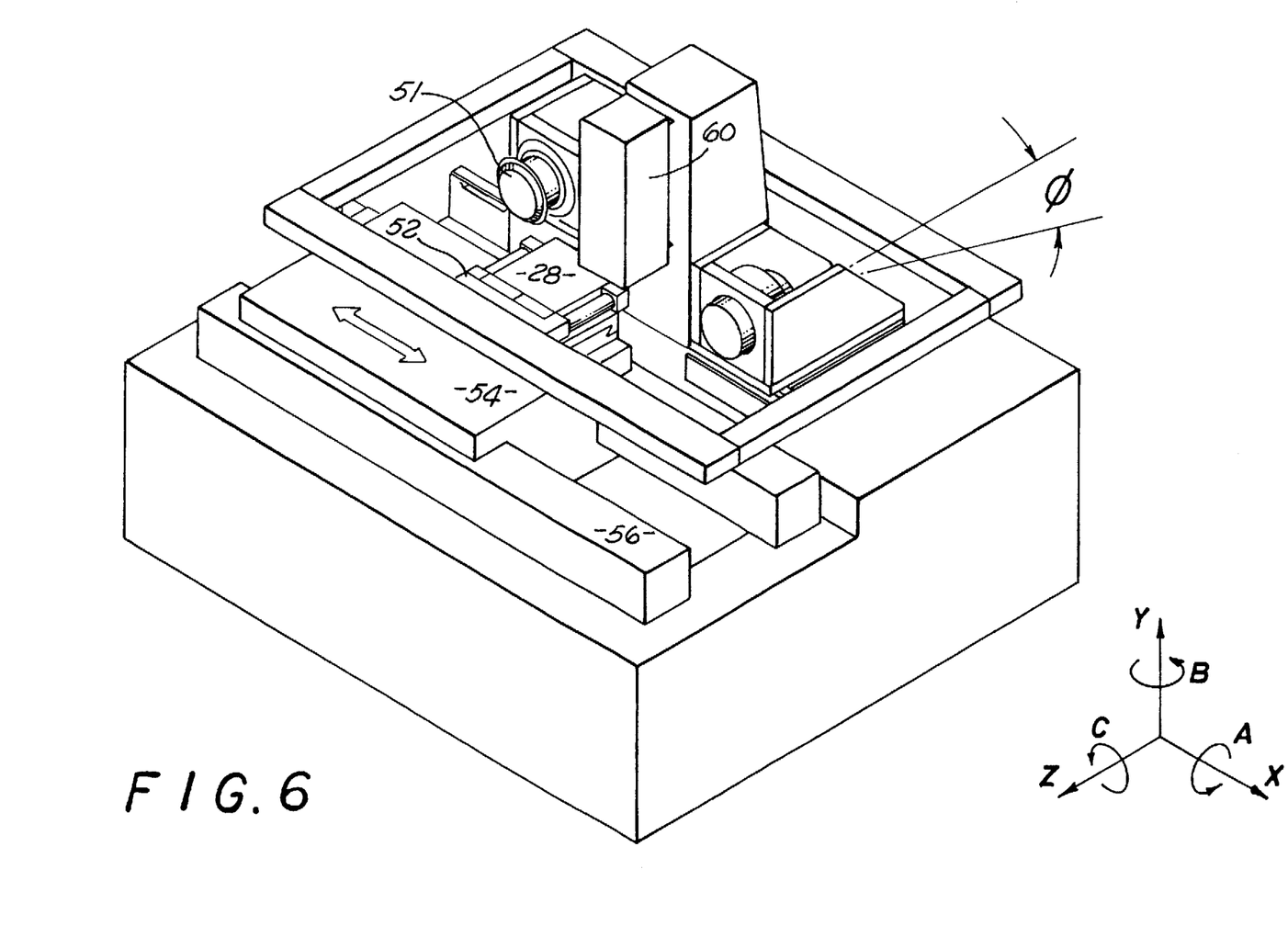
FIG. 6 is a schematic view in perspective showing the apparatus of FIG. 4 shown in a position for forming the leading edge ramp on a magnetic head forming unit.
Figure 7:
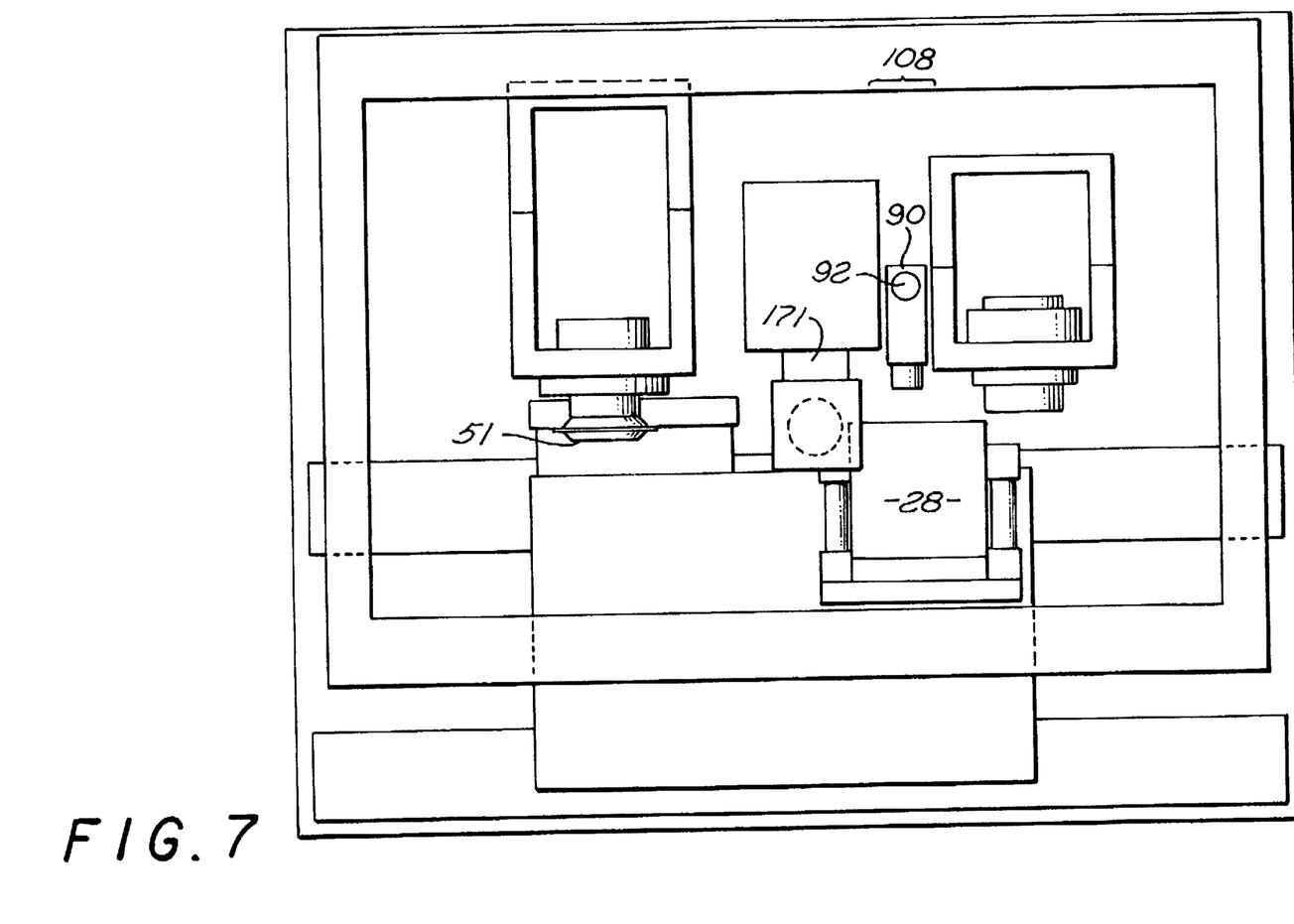
FIG. 7 is a top plan view showing the apparatus of FIG. 4 forming air bearing surface rails on a head forming unit.

In FIG. 4, the apparatus of the invention is shown during one of the inspection operations whereat the wafer 28 is brought into the inspection station 104 and under the microscope 60. In FIG. 5, the same apparatus is shown during one of the grinding operations whereat the wafer 28 is passed across the grinding station 106 and brought into contact with the grinding portion of the grinding wheel 64. In FIG. 6, the same apparatus is shown with the grinding station 106 readied at a small angle, $\phi$, rotated about the X$_T$ axis to form a ramp. Typically, $\phi$=0.5° to 1.0°. In FIG. 7, the same apparatus is shown with the wafer at a laser milling station 108 for laser ablation of the sliders. And, in FIG. 8, the same apparatus is shown with the wafer positioned in the slicing station 102 for slicing off a row of completed heads as a bar.

Further reference is made to FIG. 4 wherein localized orthogonal coordinate systems are defined for the wafer 28, the slider 54, the microscope 60, and the machining wheel 64 with respect to global orthogonal coordinate system XYZ. It should be understood that the wafer 28 and the components 54, 60 and 64 are shown in relatively close proximity to each other for convenience of illustration in the FIG. 4; however, the components are well spaced along the length of the rail 56 to define a plurality of discrete processing stations.

The position of the wafer 28 in space is described by three translational coordinates $X_w$, $Y_w$, and $Z_w$ and corresponding rotational coordinates $A_w$, $B_w$, and $C_w$, respectively. The transducers 24 on the wafer 28 are essentially collinear and thus define the $X_w$ direction. The $Y_w$ axis is orthogonal to $X_w$ and is perpendicular to the top surface of the wafer 28. The $Z_w$ axis is orthogonal to both $X_w$ and $Y_w$. For purposes of properly aligning the wafer 28, the slide 54 in conjunction with the actuator means 62 is capable of altering the $X_w$ and $Z_w$ linear positions as well as the $B_w$ angular orientation of the wafer 28.

The position of the slide 54 in space is described by a similar set of independent translational coordinates $X_s$, $Y_s$, and $Z_s$ and corresponding rotational coordinates $A_s$, $B_s$, and $C_s$, respectively. During machining of the wafer 28, the slide 54 is free to move only in the direction parallel to $X_s$ and is constrained from moving in the $Y_s$ and $Z_s$ linear directions and from rotating about any axis.

The position of the microscope 60 in space is described by the translational coordinates $X_m$, $Y_m$, and $Z_m$ and corresponding rotational coordinates $A_m$, $B_m$, and $C_m$, respectively. The microscope 60 is mounted on flexural bearings that allow the microscope to translate parallel to $Y_m$ for the purpose of focusing an image on a charged coupled device (CCD). The microscope is constrained in the remaining five coordinates.

The position of the machining wheel 64 in space can be described by its own set of translational coordinates $X_t$, $Y_t$, and $Z_t$ and corresponding rotational coordinates $A_t$, $B_t$, and $C_t$, respectively. The wheel 64 rotates about the $Z_t$ axis so that the $C_t$ coordinate is free to vary. The wheel 64 is prevented from translating in $X_t$, $Y_t$, and $Z_t$ and from rotating in $A_t$ and $B_t$. The motion of abrasive in the machining wheel is tangential to the rotation of the wheel 64 and is primarily in the $Y_w$ direction as the wheel moves through the machining plane of the wafer 28. The machining plane is the plane defined by the motion of the abrasive ($Y_w$) and the motion of the slide 54 ($X_s$). As the slide 54 and the wafer 28 translate in $X_s$, portions of the wafer 28 protruding through the machining plane are removed by the abrasive as the abrasive contacts the wafer 28.

Figure 10:
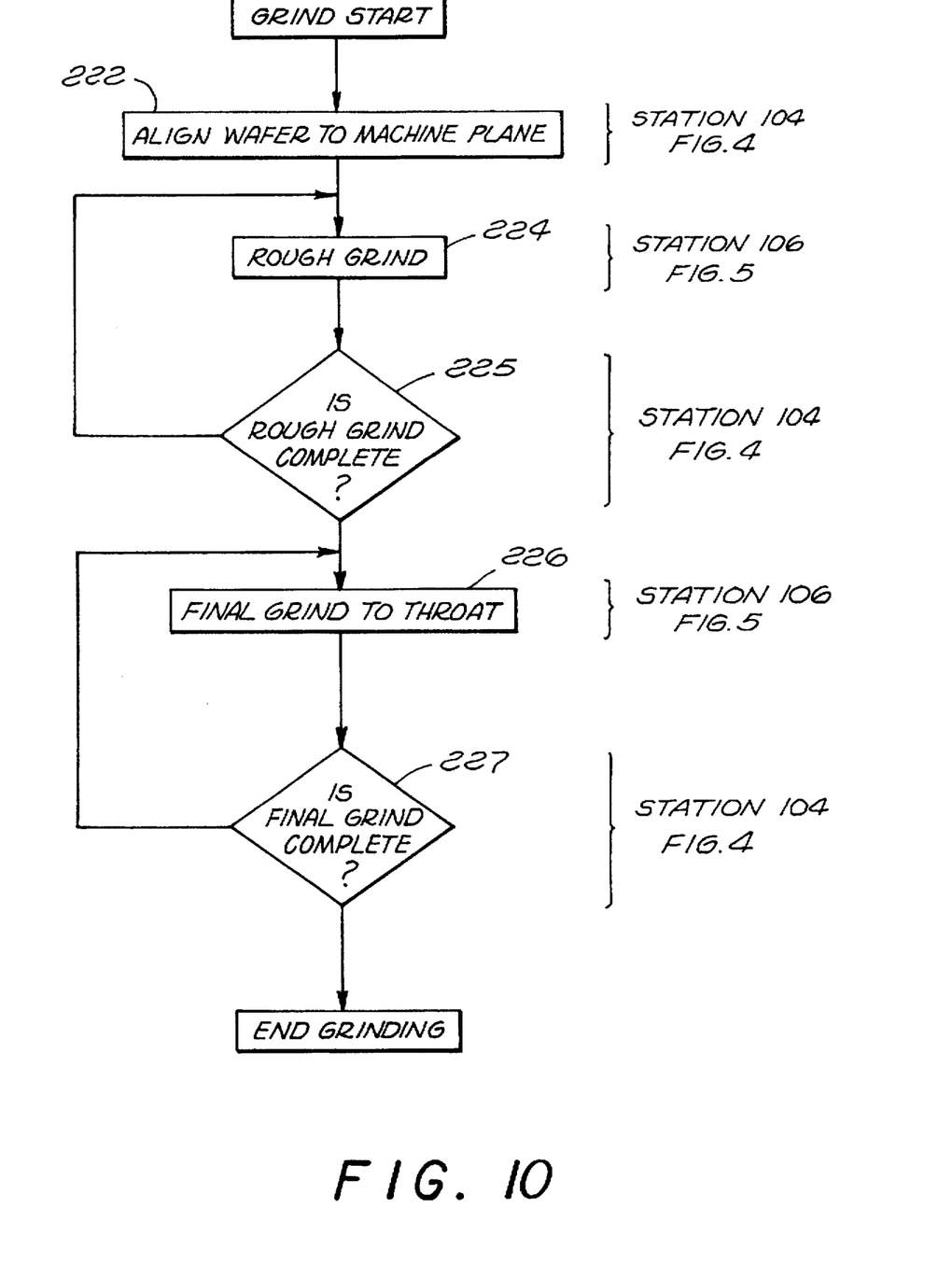
FIG. 10 is a process flow diagram of the grinding steps of FIG. 9.

As stated previously, machining an air bearing surface and hence defining throat height requires machining a substantially flat plane onto the end of the wafer 28, the major axis of which must be parallel to $X_w$ and the minor axis of which must be parallel to $Y_w$. Any error in the angular relationship between $X_w$ and $X_s$ will cause an error in throat height that is proportional to the sine of the angular error, denoted $B_{error}$. In order for $B_{error}$ to be zero, $X_w$ and $X_s$ must be parallel. It is a feature of the present invention, therefore, that the block 222 in FIG. 10 provides alignment of the squared wafer 28 with the machining plane.

Alignment of the squared wafer 28 is accomplished by measuring the angle between $X_w$ and $X_s$ ($B_{error}$) and then altering orientation $B_w$ until the error angle is reduced to zero. This measurement is made by traversing the wafer 28 by moving the slide in $X_s$ and observing the transducers 24 with the microscope 60. Misalignment is observed as a change in position in the direction $Z_s$ of adjacent transducers. $B_{error}$ preferably is reduced by use of a least squares computation. The $Z_s$ measurements from each transducer is denoted $Z_{sj}$, where $2<=j=n$, n being the number of transducers to be measured. The arithmetic mean of all $Z_{sj}$ is denoted $\bar{Z}_s$; $\bar{Z}_s$ thus being a function of the error angle $B_{error}$. The object of aligning the wafer 28 is to minimize $S=\Sigma((Z_{sj}-\bar{Z}_s)^2)$ by minimizing $B_{error}$. $B_{error}$ is minimized by changing $B_w$, which is a rotation of the wafer 28 about the $Y_w$ axis.

During the alignment step 222, the throat height of the transducers 24 at each end of the working row of the wafer 28 also are measured. The throat height data is used subsequently to control the grinding operation.

After aligning the wafer 28 with the machining plane, the wafer undergoes a two stage grinding process (blocks 224 and 226) in which the appropriate throat height and ramp structures are achieved by contacting the transducer bearing head portion 14 of the wafer 28 with abrasive held in the wheel 64 while the wheel rotates at a high speed.

The wheel 64 is a rigid disc-shaped matrix made preferably of a thermosetting resin having a modulus of elasticity of approximately $7 \times 10^9$ Newtons/meter and contains a conductive agent such as graphite or copper. The conductive agent is added in order to keep the wafer 28 and the wheel 64 at the same electrical potential to eliminate the possibility of arcing. Alternatively, bronze, cast iron, or other suitable matrix material can be used.

The cross-sectional dimensions of the abrasive are less than about 8 microns (i.e., from zero to 8 microns, as stated in the trade) and in a preferred embodiment the abrasive concentration in the matrix is in the range of about 15% by volume to about 24% by volume. More preferably, the cross-sectional dimension of the abrasive is 6 microns (which is generally to the trade as in the range of from 4 to 8 microns centered on 6 microns) with a strong grouping of the size distribution about 6 microns. Preferably, the abrasive is diamond particles. The grinding wheel can be purchased from Norton Company of 1 Bond St., Worcester, Mass., under the designation - 6A2 Cup Wheel.

Figure 11:
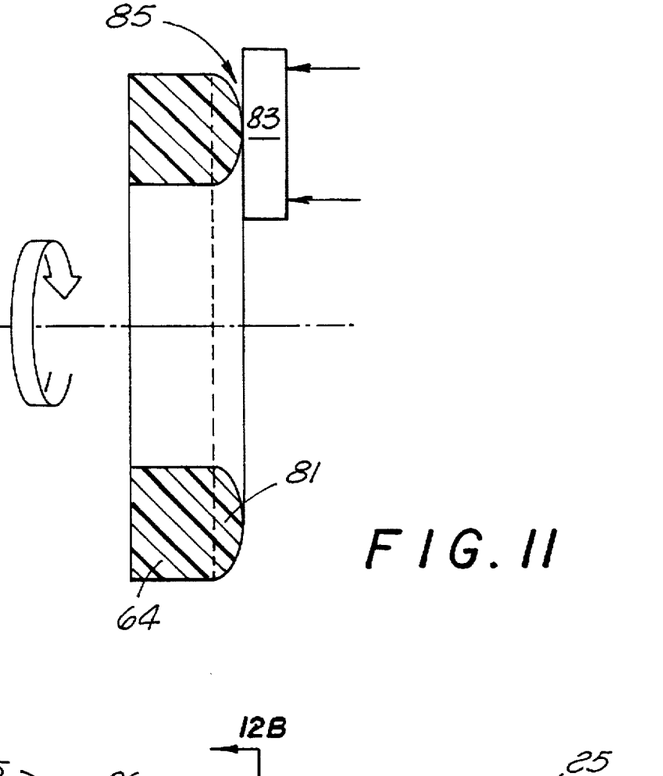
FIG. 11 is a schematic diagram showing shaping of the grinding wheel to give a slight crown for use in the present invention.

The cup wheel 64 is generally in the form shown in cross-section in FIG. 11 and is preferably provided with a slight crown 81 of frusto-annular shape. This may be achieved by pushing a slightly compliant disk 83, such as a conventional one-sixteenth inch thick Pyrex microscope slide carrying a diamond particle paste at 85, against the grinding surface, as shown.

During the rough grinding step 224 the throat height is reduced to a dimension which is approximately one micron greater than the final desired throat height. Rough grinding is accomplished by making multiple passes of the wafer 28 across the face of the wheel 64. During each pass, the wafer 28 preferably is first fed toward the wheel ($Z_s$) a distance in the range of about 1 microns to about 5 microns, and then is fed across the face of the wheel 64 at a rate $dX_s/dt$ in the range of about 40 microns per wheel revolution to about 100 microns per wheel revolution. The peripheral speed of the wheel 64 preferably is in the range of about 50 meters per second to 100 meters per second. Deionized water coolant is applied to the wafer/wheel interface at a flow rate in the range of about 70 ml per second to about 140 ml per second with a speed on the same order of magnitude as the peripheral speed of the wheel 64.

Final grinding 226 is accomplished by making multiple passes of the wafer 28 across the face of the wheel 64. When the rough grinding cycle 220 is completed, the throat height is measured without altering $Y_w$, $Z_w$, $A_w$, $B_w$ or $C_w$. The difference between the expected throat height and the actual throat height is utilized to recalibrate the relationship between $Z_w$ and $Z_t$ for accurate final grinding.

During final grinding 226, for each pass the wafer 28 preferably is first fed toward the wheel ($Z_s$) a distance in the range of about 200 nanometers to about 400 nanometers. The sequence of passes are determined such that during the final pass, the axial motion of the strip is at least about 200 nanometers and that the exact throat height is achieved as the strip is fed-radially across the face of the wheel 64 at a rate $dX_s/dt$ in the range of about 40 microns per wheel revolution. The peripheral speed of the wheel 64 preferably is in the range of about 50 meters per second to 100 meters per second. Deionized water coolant is applied to the wafer/wheel interface at a flow rate in the range of about 70 ml per second to about 140 ml per second with a speed on the same order of magnitude as the peripheral speed of the wheel 64.

An important advantage of machining with abrasive in a fixed matrix as opposed to prior lapping techniques is that lapping is a loose abrasive process that relies on pressure between a lap and a work piece to remove material from the work piece. Lapping therefore is a pressure-copying process where the shape produced is a function of the pressure on the work piece as opposed to the present motion-copying process embodied in the steps 220 and 230. Because it is generally more simple to control position (i.e. depth of penetration) than contact pressure, the present process is uniquely adapted to machining appropriate throat height and air bearing surface microgeometry across an entire single-row strip 38 to a high degree of accuracy. For instance, the relative motion in the Z direction, $|Z_t-Z_w|$, is controlled such that the penetration of the abrasive into the wafer material is within 25 nanometers of a nominal value. As a result, wafer material is actually removed by plastic flow without fracturing the surface of the brittle composite wafer and the microgeometry of the resulting air bearing surface 20 is accurately controlled.

To achieve very accurate relative motion between the abrasive and the wafer, the individual motions of the abrasive and the wafer are accurately controlled. Particularly, the wheel 64 is mounted to a spindle 160 that provides an extremely accurate axis of rotation. In addition, the spindle 160 is extremely stiff and is capable of supporting high rotational speed. The spindle 160 preferably is supported on high precision bearings such as aerostatic bearings, hydrostatic bearings, or magnetic bearings. In particular, Blockhead type spindles manufactured by Professional Instruments Company of Minneapolis, Minn. have exceptional performance. Similarly, the slide 54 provides extremely accurate linear motion over travel distances on the order of the wafer size. The slide mounting structure is extremely stiff and preferably includes high precision bearings such as aerostatic bearings, hydrostatic bearings, or magnetic bearings. Position resolution to 5 nanometers is achieved with the structure of the invention and can be measured and controlled using capacitance gauges and linear encoders with gratings, or by interferometric techniques, as is known in the art. Such measuring systems are readily connected in a feedback loop with actuators 62 to establish position control.

In order to realize the accuracy of the spindle 160 and the slide 54, the structure supporting them is sufficiently rigid and stable that the loop stiffness (that is, the equivalent stiffness of the intermediate elastic elements arranged in series) between the cutting tool and the slide 54 is greater than approximately 30 Newtons per micron, and is in fact as high as possible. The disclosed loop stiffness is essential for maintaining precise relative motion between the abrasive and the wafer in the presence of time-varying reaction forces generated during grinding. Further, the rigidity of the grinding wheel is preferably at least two to three times that of the loop stiffness, and is achieved with the grinding wheel specified.

Machining a leading edge ramp 22 (block 230) on the wafer 28 requires machining an essentially flat plane onto the exposed end of the wafer, the major axis of which is parallel to the direction $X_w$ and the minor axis of which is at a specified angle from the direction $Y_w$. A grinding apparatus identical to the wheel 64 used for achieving the appropriate throat height is used to machine a leading edge ramp 22. The $Z_w$ coordinates of the wafer 28 and the $A_t$ coordinates of the wheel are altered by displacing the slider coordinates $Z_s$ and wheel coordinates $A_t$ so that the machining plane and the desired plane of the leading edge ramp are coplanar. In practice, this means that the plane defined by the wafer 28 is rotated relative to the plane defined by the wheel 64 as shown in FIG. 5 by energizing the actuator means 62 and tilting the wafer-bearing portion of the slide 54 through an angle θ.

Machining of the leading edge ramp is accomplished by making a single pass of the wafer 28 across the face of the wheel 64. The wafer 28 preferably is fed across the face of the wheel 64 at a rate $dX_s/dt$ in the range of about 40 microns per wheel revolution to about 80 microns per wheel revolution and the peripheral speed of the wheel 64 preferably is in the range of about 50 meters per second to 100 meters per second. Deionized water coolant is applied to the wafer/wheel interface at a flow rate in the range of about 70 ml per second to about 140 ml per second with a speed on the same order of magnitude as the peripheral speed of the wheel 64.

If the desired roughness average Ra of the machined air bearing surface is less than about 20 Å, or if aggressive micro-cleaning of the air bearing surface is desired, polishing is performed at block 240 by a soft polishing pad (not shown) about an axis of rotation which is substantially parallel to $Z_r$. The pad is preferably charged with aluminum oxide or diamond having a particle size in the range of about 0.25 micron to about 1.0 micron. The slide 54 is translated in $X_s$ past the face of the polishing pad 84 and deionized water is applied to lubricate the pad/wafer interface.

The step shown at 250 represents the novel capability of the present invention to form air bearing surface rails 16 in each head forming unit in the exposed head portion 14 of the wafer 28 before the heads 10 are removed from the wafer. The rails 16 are formed by machining relieved regions into the wafer 28 by laser ablation. Ablation is a technique well understood by those versed in the art (U.S. Pat. No. 4,835,361) and involves the removal of ceramic material with a focused energy beam, such as a laser. Regions on the wafer which are to be machine relieved are positioned relative to $X_w$ and $Y_w$. The pattern of the relieved areas as well as the depth of the relieved areas may freely be varied.

A laser machining apparatus 90 (FIG. 7) consists of an adjustable laser beam generator positioned on a movable slide 92 with directional coordinates $X_l$, $Y_l$, $Z_l$, $A_l$, $B_l$ and $C_l$. The laser beam projects in the $Z_l$ direction. The slide 92 can be traversed in the $Y_l$ and $Z_l$ directions and is constrained from moving in the other coordinates. Machining is accomplished by focusing the laser onto the air bearing surface by translating $Z_l$ and removing material by ablation in a pattern defined by translating $Y_l$ and $X_s$.

Figure 8:
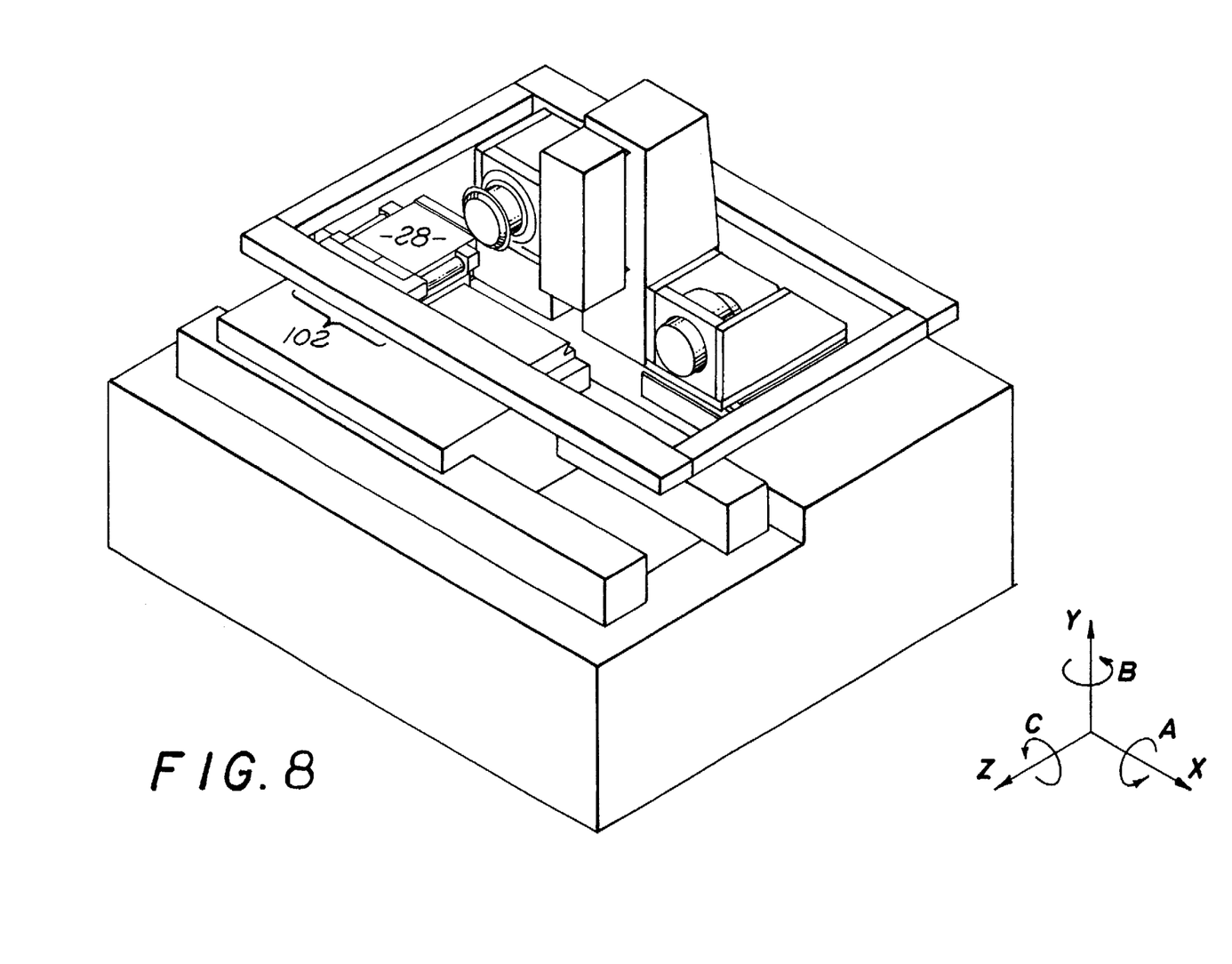
FIG. 8 is a schematic view in perspective showing the apparatus of FIG. 4 slicing a single-row bar of head forming units from a processed wafer.
Figure 9:
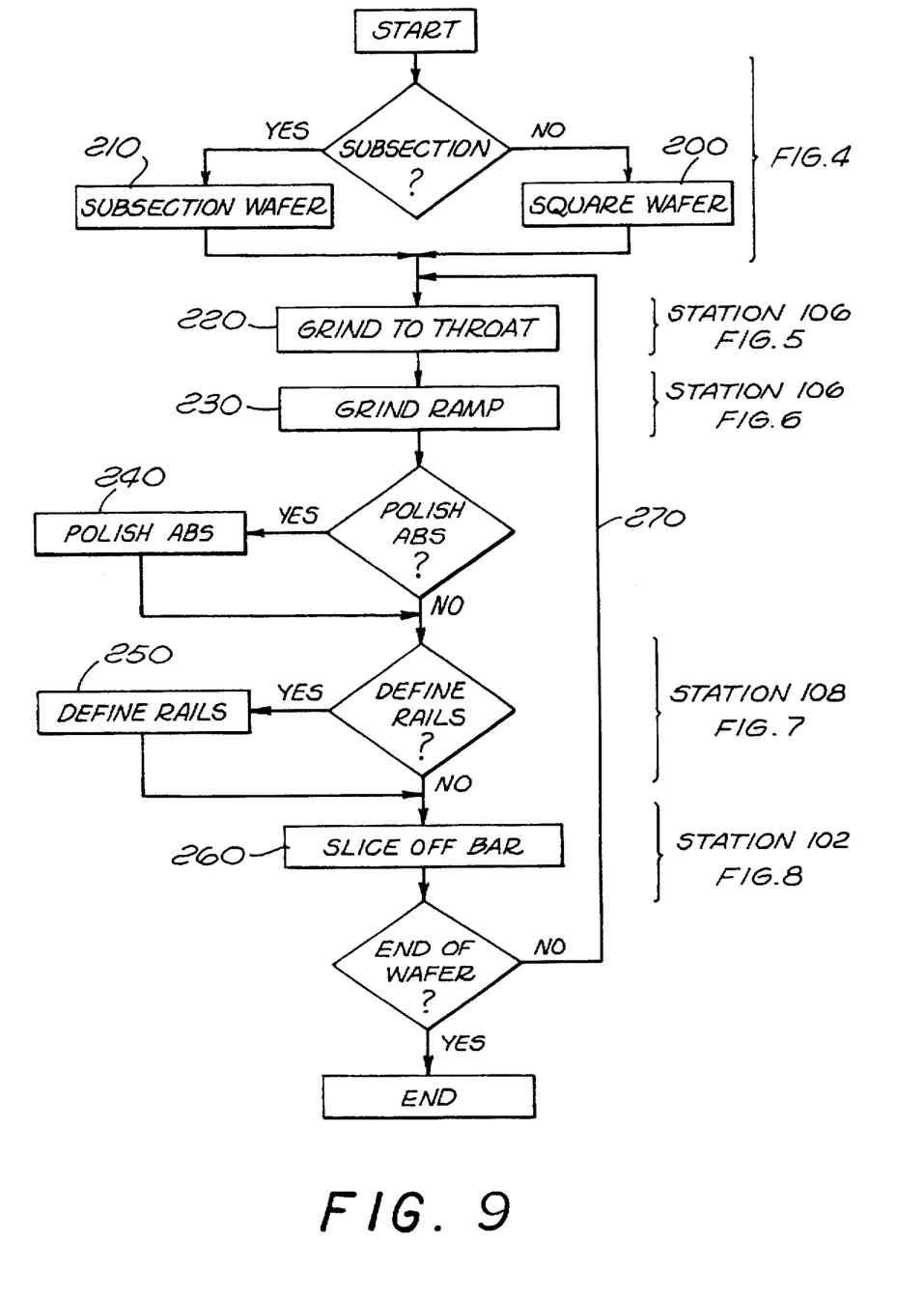
FIG. 9 is a process flow diagram of the method of head manufacture in accordance with the present invention.

When machining of the air bearing surface rails 16 is completed, the machined strip comprising the row of heads formed at the exposed portion 14 of the wafer 28 is sliced from the wafer (block 260) at a slicing station generally designated in FIG. 8 at numeral 102. In the disclosed embodiment the slicing station 102 is upstream of the grinding station 106 so that the slide 54 moves oppositely along the rail 56 to encounter the slicing tool 51.

As described above relative to the wafer subsectioning step 210 and the wafer squaring step 200, the slicing operation 260 is performed by feeding the wafer 28 into the slicing wheel 51 at a rate ($dX_s/dt$) in the range of about 4 mm per second to about 6 mm per second while the tool operates with a peripheral velocity in the range of about 70 meters per second to about 120 meters per second. During slicing of the wafer 28 the wheel/wafer interface is cooled with deionized water flowing at a velocity on the same order of magnitude as the peripheral speed of the wheel 51 and with a flow rate preferably in the range of about 70 ml per second to about 150 ml per second.

After the slice is completed, the removed bar 38 is released from the clamp 112 so that individual heads 10 can be separated from the bar. The slide 54 then returns to the alignment station 104 after the slice is completed and the process of forming and removing successive bars from the wafer 28 continues along the process flow line 270 until the wafer is exhausted.

The continuous fabrication of single-row bars 38 in situ not only reduces the handling and production time/cost of individual heads, but serves also to eliminate the problems associated with the bowing of bars processed individually according to prior methods. Also, an advantage of fabricating the rails 16 before slicing the bar 38 from the wafer 28 is that the need to remount and precisely align the bar with suitable machining tools is eliminated and the costs associated with production time are reduced.

Importantly, the capability of controlling the depth of penetration of abrasive into a strip to a distance of about 25 nanometers or less results in a manufacturing method highly superior to previous lapping techniques. Since the depth of penetration, and hence material removal, can be controlled with far greater precision than the rate at which material is removed by lapping, the present invention accurately controls throat height tolerances and the surface finish (and hence the contact area or bearing ratio) of air bearing surfaces. In addition, problems associated previously with recession of electromagnetic pole tips below an air bearing surface are eliminated.

To those skilled in the art to which this invention pertains, other improvements will occur which should be understood to be within the spirit and scope of this invention, which is to be limited solely by the following claims.

What is claimed is:

1. A method for processing a wafer comprising at least one strip containing a plurality of head forming units including respective transducers embedded in said wafer, comprising the steps of:
   supporting the wafer to expose the head forming units of said strip for treatment;
   removing material from the head forming units by contacting the respective head forming units with an abrasive held in a rigid matrix to form a throat height for said transducers and to form a leading edge ramp on the respective said head forming units by grinding; and
   removing the strip of head forming units from the wafer as a bar for subsequent processing.

2. The method as in claim 1 wherein the abrasive comprises particles having a maximum cross sectional dimension less than about 8 microns supported in a rigid matrix.

3. The method as in claim 1 wherein the abrasive is diamond.

4. The method as in claim 1 wherein the abrasive has a concentration in the matrix in the range of about 15% by volume to about 24% by volume.

5. The method as in claim 1 including the step of controlling depth of penetration of the abrasive into the strip within a distance of less than about 25 nanometers relative to a preselected nominal value.

6. The method as in claim 1 wherein the matrix comprises a material selected from the group consisting of thermosetting resin impregnated with a conductive material, bronze, and cast iron.

7. The method as in claim 1 including the step of continuously moving the matrix relative to the strip during contact with the strip.

8. The method as in claim 1 in which the matrix is a disc-shaped wheel having a frusto-annular shape rotated about an axis thereof.

9. The method as in claim 8 including the step of rotating the wheel to have a peripheral speed in the range of about 50 meters per second to about 120 meters per second.

10. The method as in claim 1 in which the strip is integral with said wafer prior to processing, and including the step of separating the strip from said wafer.

11. The method as in claim 1 including the step of cooling the strip with liquid while the heads are being formed.

12. A method for making magnetic heads from a strip integrally part of a wafer and containing a plurality of transducers, comprising the steps of:
   forming a plurality of head forming units along the strip by grinding the strip with an abrasive held in a rigid matrix;
   severing the strip from the wafer to form a bar; and
   removing the individual head forming units from the bar after the bar is severed from the wafer.

13. The method as in claim 12 in which said rigid matrix is selected from the group consisting of a plastic loaded with conductive filler, bronze, and cast-iron, and in which said abrasive is diamond particles having a size less than 8 microns.

14. The method as in claim 12 in which said rigid matrix is thermosetting plastic having a modulus of elasticity of about $7 \times 10^9$ Newtons/meter containing a conductive filler of graphite or copper.

15. A method for making magnetic heads from a wafer containing rows of transducers embedded in said wafer, each said row defining a strip of head forming units, comprising the steps of:
   positioning an outermost strip with a surface thereof exposed;
   removing material from the strip by contacting the exposed surface thereof with an abrasive held in a rigid matrix to form individual processed head forming units along the strip;
   severing the strip from the wafer to define a severed bar and to expose an outer surface of another strip; and
   removing the individual head forming units from the severed bar to form respective discrete heads.

16. The method as in claim 15 including the steps of:
   removing material from another strip by contacting the exposed surface thereof with an abrasive held in a rigid matrix to form individual processed head forming units along the strip;
   severing the strip from the wafer to define an additional severed bar and to expose an outer surface of another strip;

removing the head forming units from the additional severed bar to create respective heads; and repeating the foregoing steps until all strips in the wafer have been processed.

17. A method for making magnetic heads from a strip integral with an adjacent substrate and containing a plurality of transducers with electromagnetic poles thereof located on an exposed surface of the strip, comprising the steps of:

removing material from the exposed surface of the strip by grinding the strip with an abrasive held in a rigid matrix to form individual head forming units along the strip until each transducer has a desired throat height of the poles therein;

forming a pair of air bearing surface defining rails in each head forming unit while the strip is integral with said substrate;

severing the strip from the substrate to define a bar; and removing the head forming units from the bar after the bar is severed from the substrate to form said magnetic heads.

18. The method as in claim 17 in which the rails are formed by removing material from the exposed surface of the strip by laser ablation.

19. A method for making magnetic heads from a strip integral with an adjacent substrate and containing a plurality of transducers with electromagnetic poles thereof located on an exposed generally planar surface of the strip, comprising the steps of:

securing the substrate to a carrier guided for movement along a predetermined path;

moving the carrier along said path between a plurality of processing stations at which the strip is machined to form individual head forming units along the strip while the substrate remains secured to the carrier;

severing the strip from the wafer to define a bar of said head forming units; and removing the head forming units from the bar to produce said magnetic heads.

20. The method as in claim 19 in which the path of the carrier is parallel to a substantially planar face of a rotary cutting tool, and including the step of advancing the carrier along the path to drive the strip into contact with the cutting tool.

21. The method as in claim 20 in which the strip is driven past the cutting tool at a rate in the range of about 40 microns per tool revolution to about 100 microns per tool revolution.

22. The method as in claim 20 in which the strip is driven past the cutting tool at a rate in the range of about 1 microns per tool revolution to about 40 microns per tool revolution.

23. The method as in claim 19 in which the path of the carrier is parallel to a substantially planar face of a rotary cutting tool, and including the step of advancing the carrier along the path to drive the strip into contact with the cutting tool.

24. The method as in claim 21 in which the strip is repeatedly passed by said cutting tool and is fed toward the cutting tool in a direction parallel to the axis of rotation of said cutting tool at a rate in the range of about 1 micron per pass by the tool to about 5 microns per pass by the tool.

25. The method as in claim 22 in which the strip is repeatedly passed by said cutting tool and is fed toward the cutting tool in a direction parallel to the axis of rotation of said cutting tool at a rate in the range of about 200 nanometers per pass by the tool to about 400 nanometers per pass by the tool.

26. The method as in claim 19 in which the path of the carrier is parallel to a substantially planar face of a rotary cutting tool, and including the step of alternately orienting the substrate relative to the cutting tool so that when the strip is advanced along the path the cutting tool forms mutually oblique planar surfaces on the strip.

27. The method as in claim 19 in which the substrate is a wafer, and including the step of slicing superfluous portions of the wafer at an initial one of said processing stations to expose said strip of the wafer desired to be machined.

28. The method as in claim 19 including the steps of sensing the orientation of the exposed surface on the strip relative to the direction of the path and a substantially planar face of a rotary cutting tool; and adjusting the position of the substrate on the carrier so that the exposed surface on the strip is appropriately aligned with the direction of the path and the planar face of the rotary cutting tool.

* * * * *